United States Patent [19]

Leiber et al.

[11] Patent Number: 4,904,029

[45] Date of Patent: Feb. 27, 1990

[54] ANTILOCKING SYSTEM

[75] Inventors: Heinz Leiber, Oberriexingen; Manfred Steiner, Stuttgart, both of Fed. Rep. of Germany

[73] Assignee: Daimler-Benz AG, Stuttgart, Fed. Rep. of Germany

[21] Appl. No.: 339,526

[22] Filed: Apr. 17, 1989

[30] Foreign Application Priority Data

Apr. 16, 1988 [DE] Fed. Rep. of Germany ....... 3812829

[51] Int. Cl.$^4$ .............................................. B60T 8/40
[52] U.S. Cl. ...................................... 303/116; 303/92
[58] Field of Search ................. 303/92, 103, 105, 107, 303/108, 115, 116, 119

[56] References Cited

U.S. PATENT DOCUMENTS

| 4,779,935 | 10/1988 | Kuwana et al. | 303/116 |
| 4,790,608 | 12/1988 | Burgdorf et al. | 303/116 X |
| 4,805,967 | 2/1989 | Arikawa | 303/116 |

FOREIGN PATENT DOCUMENTS

| 3030621 | 3/1981 | Fed. Rep. of Germany. |
| 3119982 | 12/1982 | Fed. Rep. of Germany. |
| 3322422 | 1/1985 | Fed. Rep. of Germany. |
| 3347618 | 7/1985 | Fed. Rep. of Germany. |
| 3637781 | 5/1988 | Fed. Rep. of Germany. |

OTHER PUBLICATIONS

Bosch Technische Berichte, vol. 7, No. 2, pp. 86–87.

*Primary Examiner*—Duane A. Reger
*Attorney, Agent, or Firm*—Barnes & Thornburg

[57] ABSTRACT

For a road vehicle with front axle/rear axle brake circuit subdivision, in which the rear axle brake circuit is designed as a static brake circuit with an antilocking system operating on the pump-back principle providing brake pressure control according to the select-low principle and in which the return pump is designed as a hydraulically driven piston pump whose valve chamber is connected via an inlet non-return valve to the section of the main brake pipe of the rear axle brake circuit branching off to the rear wheel brakes and, via an outlet non-return valve, to the pressure outlet of the main brake unit associated with the rear axle brake circuit. The section of the main brake pipe extending between the connection positions of the two non-return valves can be shut off by means of a single brake pressure control valve designed as a 2/2-way solenoid valve. The control of the brake pressure reduction and pump-back strokes of the pump piston is provided by a drive control valve designed as a 3/2-way solenoid valve whose basic position connects the drive pressure space of the return pump to the high pressure output of an auxiliary pressure source and whose activated position relieves the drive pressure space of the return pump to a non-pressurized sump tank of the auxiliary pressure source.

16 Claims, 2 Drawing Sheets

ANTILOCKING SYSTEM

BACKGROUND AND SUMMARY OF THE INVENTION

The invention concerns an antilocking system for a road vehicle with a hydraulic two-circuit brake installation in which the rear wheel brakes are combined in a static brake circuit, connected to an output pressure space of a brake unit, which can be actuated by means of a brake pedal. The brake unit is capable of generating an output pressure proportional to an actuating force. The output pressure can be connected to the wheel brakes of this static rear axle brake circuit by means of an electro-hydraulic brake pressure control valve arrangement provided for controlling brake pressure reduction, brake pressure retention and brake pressure restoration phases. The antilocking system operates on the pump-back principle according to which, in a brake pressure reduction phase, brake fluid drained from a wheel brake subject to the control system is pumped back by means of a return pump into the output pressure space of the brake unit associated with the static brake circuit. This return pump is designed as a piston pump which is driven hydraulically with its drive pressure space being subjected to and relieved from a pressure under control of a solenoid valve control. The pump chamber piston pump is connected to the wheel brake, currently subjected to the control system, via an inlet non-return valve and, via an outlet non-return valve, to the output pressure space of the brake unit associated with the static brake circuit. The antilocking control takes place on the select-low principle according to which, independent of whether a locking tendency occurs on one or both wheels of the static brake circuit, the brake pressure on both wheel brakes is always kept at the same value and the control signals necessary for the correct control switching of the brake pressure control valve arrangement and the solenoid valve arrangement controlling the pump drive are provided by an electronic control unit. The unit generates these signals by a process of comparing and differentiating—with respect to time—electrical output signals from wheel rotational speed sensors whose output signals, in level and/or frequency, are a measure of the wheel peripheral speeds of the vehicle wheels.

An antilocking system of this general type is known from the German patent specification No. DE 3,119,982,C2 if it is assumed that the brake pressure control valves individually associated with the driven rear wheels of the vehicle are actuated in common. This is explained as being a rational measure from a control technical point of view by the publication Bosch, Technische Berichte, Volume 7 (1980), Number 2, Page 87, right-hand column.

An antilocking system of this general type is also known from No. DE-OS 3,347,618.7-21, although this describes an antilocking control system operating on the pump-back principle which utilizes a hydraulically driven return pump for the front axle brake circuit. In this system, the control operates as a single wheel control system on the select-high principle and a control system on the select-low principle is only explicitly revealed for the rear axle brake circuit, designed in that case, as an open brake circuit.

For the static brake circuit, the known antilocking system provides a low pressure reservoir which quantitatively accepts the brake fluid drained from a wheel brake subject to the control system in a pressure reduction phase. This brake fluid is pumped back by means of the hydraulically driven return pump into the output pressure space, associated with the static brake circuit, of the brake unit. This return pump is designed in such a way that between 0.2 and 0.4 cm$^3$ of brake fluid are pumped back per piston stroke into the output pressure space of the brake unit, which corresponds to between 1/20 and 1/10 of that quantity of brake fluid which is forced into the rear axle brake circuit in a vehicle of higher power class (vehicle weight approximately 1.5 tons and maximum speed approximately 200 km/h) when braking occurs with the maximum possible brake installation design pressure.

A valve, provided as the brake pressure control valve for the rear axle brake circuit, is a single 3/3-way solenoid valve whose basic position is the brake pressure build-up position. This valve can be driven by a control signal of defined control current strength from the basic position into a shut-off position—the brake pressure retention position—and from there into a brake pressure reduction position by a control signal of defined higher, e.g. double, control current strength. In the brake pressure reduction position, the wheel brakes subjected to the control system are connected to the low pressure reservoir from which the brake fluid is pumped back into the output pressure space of the brake unit by means of the hydraulically driven return pump.

In such a design of the brake installation and the antilocking system, pumping back to meet the requirements required to drive the hydraulic return pump with a stroke repetition frequency of at least 10 Hz leads to unpleasant noise in control operation, because of the associated pressure shocks. Such noise is not only disadvantageous because of the associated adverse effect on driving comfort, but, more particularly, because careful drivers who, due to their "defensive driving style", only cause the antilocking system to respond extremely rarely and are therefore not accustomed to this noise and thus can be startled by it and react even worse to the moment of danger with which a braking situation requiring an antilocking control system is associated.

Also disadvantageous in this known antilocking system is the substantial technical complication necessary to achieve it. This complication is due to the low pressure reservoir necessary, in addition to the hydraulically driven return pump.

The same disadvantage applies analogously, even in the antilocking system operating on the pump-back principle, widely used and known from "Bosch Technische Berichte", Volume 7, 1980, Number 2, in particular Page 87, FIG. 39 or FIG. 40. There the electrically driven return pumps each have to be designed for an output of approximately 10 cm$_3$/s if, during a brake pressure reduction phase of the antilocking control system they are to be capable of pumping back the maximum quantity of brake fluid which can be accepted within 20 ms by a low pressure reservoir into the main cylinder of the brake installation within a cycle time of 200 ms demanded by the control system. There a hydraulic pump-back drive is used instead of the electrical pump drive as is intrinsically known from No. DE 3,119,982 C2, which is designed for a comparable output, quoted in No. DE 3,119,982 C2 as 4 cm$^3$/s as a minimum value (see Column 7, lines 40–45). The dimensioning of the return pumps given in No. DE 3,119,982 C2 require a switching frequency of 20 Hz for the solenoid valve necessary to control the drive of the return pumps, which again introduces substantial noise for the pump drive.

The variants of an antilocking system known from the German Pat. No. De 3,030,621 A1 are also subject to the disadvantage of disturbing noise. In this system, piston pumps driven by means of an eccentric and individually associated with the brake circuits are provided for the control of the brake pressure restoration phases of the antilocking control system. In contrast to an antilocking system operating on the pump-back principle, these piston pumps direct brake fluid from the brake fluid reservoir into the wheel brake cylinders.

Noises associated with a response of the control system and caused by a pulsating pump drive are substantially avoided by the antilocking system known from the German Pat. No. DE 3,322,422 A1. In this system, individually allocated pressure modulators are provided for the wheel brakes subject to the control system. These pressure modulators have a stepped piston which, within a modulator housing, forms the pressure-tight movable boundary between a modulator space with a larger cross-sectional area and an annular space with a smaller cross-sectional area. The smaller diameter piston step of the modulator piston emerges in a pressure-tight and movable manner from the housing and forms the spindle nut of an electrically driven spindle drive whose actuation, in alternative rotational directions, permits the piston to be displaced in one direction or the other in the housing, so that the modulator spaces experience opposite changes in volume. The spindle drive is designed to be irreversible. The annular space of the particular modulator is permanently connected to an outlet pressure space of the brake unit provided for actuating the brakes. The modulator space with the larger cross-section is permanently connected to the wheel brake cylinder of the wheel brake which can be subjected to the control system. The outlet pressure space of the brake unit, and with it, also the annular space of the particular modulator, can be shut off by means of a solenoid valve against the particular wheel brake and the modulator space associated with it. This solenoid valve is driven into its shut-off position for the duration of the antilocking control.

In order to achieve a reduction in braking pressure in the particular wheel brake, the modulator piston is driven so as to increase the modulator space—by driving its drive motor in the correct rotational direction—so that the modulator space can accept brake fluid from the wheel brake and, at the same time, brake fluid is displaced from the annular space into the brake unit. In order to achieve brake pressure restoration phases, the drive motor of the pressure modulator is driven in the opposite rotational direction so that brake fluid is displaced from the modulator space back into the wheel brake and brake fluid can also flow from the brake unit back into the annular space of the modulator.

A disadvantageous feature, from a constructional point of view, of this known antilocking system is the high level of technical complications resulting from the fact that each modulator must be provided with its own electrical drive motor. From a functional point of view, it can be considered a disadvantage that the feedback effect of the control system, felt at the brake pedal, has a shock-like nature, particularly when the control system is designed for a very rapid response behavior, and is associated with a relatively large amplitude of motion of the brake pedal even if the control system responds relatively gently.

These disadvantages are reduced in the case of an antilocking system described in the German Pat. No. DE 36 37 781 A1, which also operates on the principle of brake pressure change in the wheel brakes subject to the control system by means of volume changes in modulator spaces. To the extent that the pressure modulators used are hydraulically driven, i.e. by a valve-controlled connection to the non-pressurized tank or the pressure output of an auxiliary pressure source provided in common for all the pressure modulators and including a pressure reservoir charging pump, the technical complication is reduced overall. To the extent that the pressure modulators, which are connected between the brake unit and the brake pressure control valves upstream of the wheel brakes, produce no effect on the brake unit as long as the brake pressure reductions necessary in control operation are only moderate, they are operated like return pumps in the case of larger magnitudes of the brake pressure reduction necessary, wherein return pumps then displace brake fluid drained from a wheel brake subject to the control system partially into the outlet pressure space of the brake unit of the brake installation, associated with this wheel brake. By this means, a feedback on the response of the antilocking system, which can be felt on the brake pedal and is uncomfortable to the driver, is limited to those cases in which drastic brake pressure changes are necessary, which is usually the case with particularly bad road conditions about which the driver should also be "informed". In those cases of antilocking system response in which only moderate brake pressure changes are necessary, i.e. in the large majority of braking situations which, although requiring the control system are still "not dangerous", a pedal reaction irritating to the driver is, so to speak, suppressed.

A disadvantageous feature of this antilocking system, however, is the fact that in order to achieve a bypass flow path by means of which braking is still possible even if the auxiliary pressure source has failed, a relatively complicated design of the pressure modulators is necessary and this again leads to increased technical complications.

The object of the invention is therefore to improve an antilocking system of the general type mentioned at the beginning in such a way that noise associated with the response of the antilocking system is substantially avoided but that, nevertheless, there is a clear reduction in the technical complexity necessary to achieve this antilocking system.

The invention achieves this object by having the brake pressure control valve designed as a 2/2-way solenoid valve which is located, hydraulically in parallel with the pump chamber and the inlet and outlet non-return valves connected to it, between the output of the main brake unit associated with the static brake circuit and the section of the main brake pipe of the rear axle brake circuit branching to the wheel brakes of the static brake circuit. The functional position of this 2/2-way solenoid valve associated with normal braking operation not subject to control is its through-flow position. The difference in volume of the pump chamber between its minimum and maximum values is at least $\frac{1}{4}$ of the volume of that quantity of brake fluid which must be forced into the rear axle brake circuit in order to generate the maximum possible brake installation design pressure in the wheel brakes of this brake circuit.

The electronic control unit for controlling brake pressure reduction phases of the antilocking control generates a combination of output signals by means of which the brake pressure control valve is switched into its shut-off position and the drive pressure space is initially connected to the tank of the auxiliary pressure source and is subsequently reconnected to its pressure output. The electronic control unit generates a signal combination for controlling the brake pressure retention phases, by means of which signal combination, the drive pressure space of the return pump is connected to the pressure output of the auxiliary pressure source and the brake pressure control valve is held in its shut-off position. For controlling brake pressure restoration phases, the electronic control unit generates a signal combination by means of which the drive pressure space of the return pump is connected to the high pressure output of the auxiliary pressure source and the brake pressure control valve is switched back into its through-flow position.

In the antilocking system of the invention, brake pressure reduction, brake pressure retention and brake pressure restoration phases controlled on the select-low principle, can be controlled in association with drive control of the return pump analogous to the known type of control for such a pump, by using a single brake pressure control valve designed as a 2/2-way solenoid valve. Relative to the otherwise necessary 3/3-way solenoid valve, this represents a substantial simplification relative to the known antilocking system in terms of both design and control. Since, from the statistical point of view, an overwhelming majority (more than 95%) of braking situations involve the brake installation being actuated with a force which corresponds to ¼ or a smaller fraction of that actuation force which must be employed in order to generate the maximum possible brake installation design braking pressure, the increase in the pump chamber achievable by a single suction stroke of the piston of the return pump also suffices. In a correspondingly high proportion of brake situations requiring control, to achieve complete brake pressure reduction in the wheel brake or brakes subject to the control system, a repetition of the pump-back stroke of the return pump will only be necessary on rare occasions. In the large majority of braking actions subject to an antilocking control system therefore, the return pump also fulfills the function of the pressure reservoir provided in the known antilocking system, which can therefore be omitted in the antilocking system of the invention, which permits a further substantial reduction in the technical complication necessary for its achievement. The fact that given the statistical frequency quoted, a single pressure reduction and pump-back stroke of the hydraulically driven return pump is sufficient to achieve a brake pressure reduction appropriate to the situation, that is beneficial with respect to both the sensitivity of the control and the "control comfort" in the sense of a reduction of otherwise disturbing noise.

This applies—a forteriori—to the dimensioning of the return pump wherein the maximum volume change of the pump chamber is between 50% and 100% of the volume of that quantity of brake fluid which must be forced into the static brake circuit (II) in order to generate the maximum possible brake installation design pressure in both wheel brakes. This ensures that a single brake pressure reduction and pump-back stroke of the pump will be sufficient in every case to achieve a reduction in brake pressure appropriate to the situation.

An output signal, characteristic of the position of the piston of the return pump, from an electronic position indicator provided for this purpose, can be connected to the electronic control in an obvious manner to control the pump operation in such a way that brake pressure reduction displacements of the pump piston are limited to the amount necessary to combat the locking tendency, thus minimizing control cycle times.

If the drive control valve arrangement provides for connecting the drive pressure space of the return pump to the auxiliary pressure source and for shutting off the latter from the drive pressure space utilizing two 2/2-way solenoid valves, of which one is connected between the high pressure output of the auxiliary pressure source and the control connection of the pump drive pressure source and of which the second is connected between the tank of the auxiliary pressure source and this control connection, the basic position of the first 2/2-way solenoid valve being its open position and the basic position of the second 2/2-way solenoid valve being in its closed off position, the pump piston can, as it were, be "stopped" hydraulically in a simple manner at a specified position, e.g. one which can be monitored by the output signal of the position indicator; this can be an advantage for "comfortable" control of an antilocking control cycle.

Providing a non-return valve hydraulically in parallel with the brake pressure control valve and acted upon in the opening direction by a pressure in the main brake pipe of the static brake circuit which is higher than that in the associated output pressure space in the brake unit, and is otherwise shut off, has the effect that where the driver reduces the actuation force during a braking action subject to the antilocking control system, the brake pressure takes up the value selected by the driver.

Other objects, advantages and novel features of the present invention will become apparent from the following detailed description of the invention when considered in conjunction with the accompanying drawings.

DETAILED DESCRIPTION OF THE DRAWINGS

Figure 1:
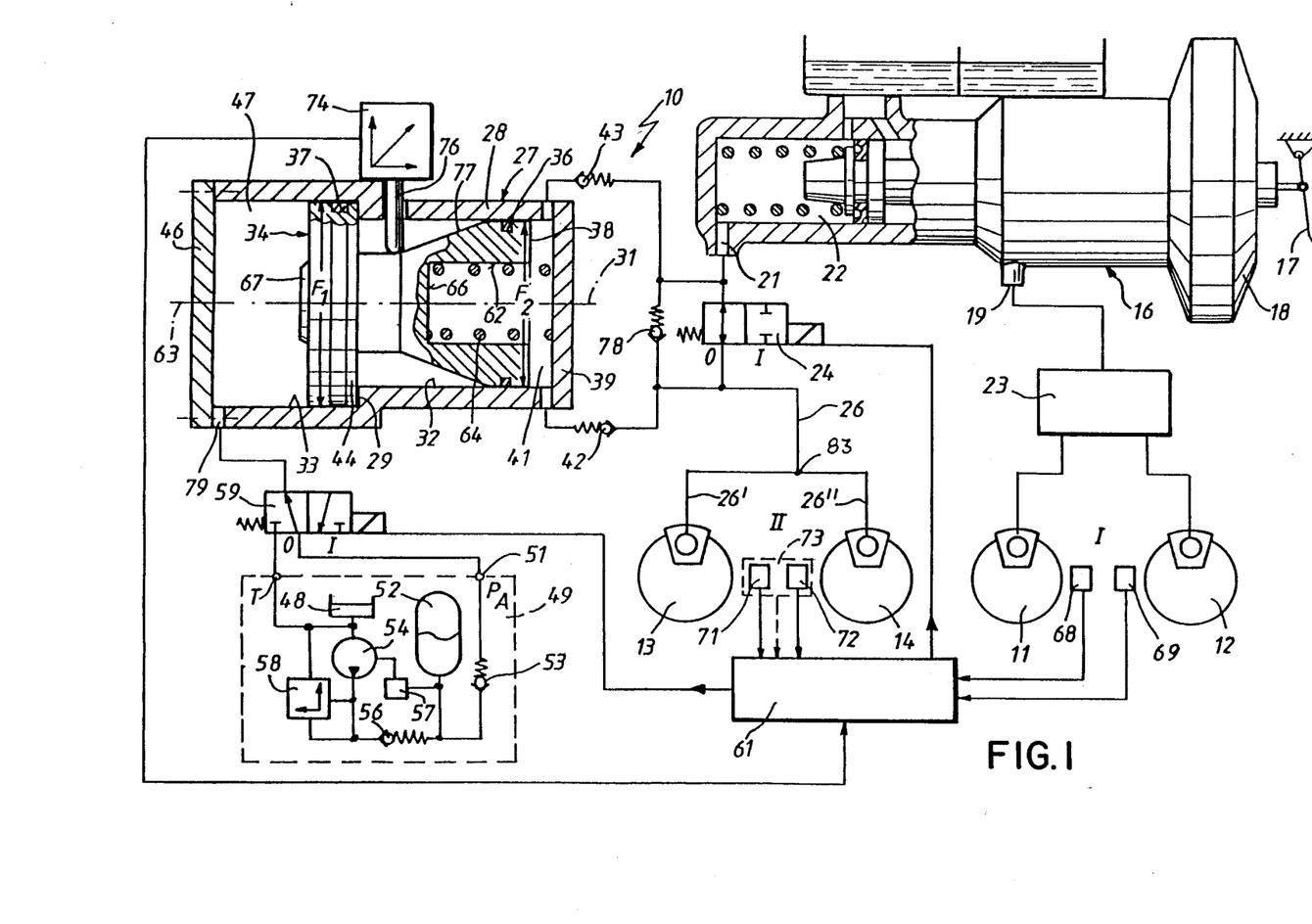
FIG. 1 shows an electro-hydraulic block circuit diagram of an antilocking system operating on the pump-back principle and having a hydraulically driven return pump.

The antilocking system 10 according to the invention, is intended for a road vehicle with a hydraulic 2-circuit brake installation, the front wheel brakes 11 and 12 of the vehicle being combined in a front axle brake circuit I and the rear wheel brakes 13 and 14 being combined in a rear axle brake circuit II. The two brake circuits I and II are assumed to be static brake circuits for whose brake pressure supply a brake unit is provided. This unit is designed as a tandem-step main brake cylinder which can be actuated by means of a brake pedal 17 via a braking force amplifier 18, e.g. a vacuum braking force amplifier. As is conventional, the front axle brake circuit I is connected to the pressure output 19 of the primary output pressure space of this tandem main cylinder 16 and the rear axle brake circuit II is connected to the pressure output 21 of the smaller cross-section secondary output pressure space 22 of the tandem main cylinder 16.

In the case of the antilocking system 10, whose design details are shown in the drawing for the rear axle brake circuit II only, it is assumed, without limiting its generality, that it is also achieved with respect to front axle brake circuit I in the same or an analogous manner and that it is therefore sufficient to explain the design and functional properties of this antilocking system 10 and the details shown with respect to the rear axle brake circuit II.

In consequence, an electro-hydraulic brake pressure adjustment device, necessary to achieve the antilocking control function on the front axle brake circuit I is represented in the drawing only by a functional block 23.

The antilocking system 10 operates in the rear axle brake circuit II on the so-called pump-back principle, according to which brake fluid drained from one and-/or the other wheel brake 13 and/or 14 of the rear axle brake circuit II, during a brake pressure reduction phase of the antilocking control, is pumped back into the output pressure space 22, associated with the rear axle brake circuit II, of the tandem main brake cylinder 16.

In addition, an antilocking control system operating on the so-called select-low principle is provided with respect to the rear axle brake circuit II, which means that the brake pressure on both rear wheel brakes 13 and 14 is always controlled to the same value, independent of whether a locking tendency occurs on both, or only one of the two rear wheel brakes 13 and 14.

In consequence, only one single solenoid valve 24, designed as a 2/2-way valve, is provided as the brake pressure control valve 24 for both rear wheel brakes 13 and 14. By means of this solenoid valve, the main brake pipe 26 of the rear axle brake circuit II leading to the rear wheel brakes 13 and 14 can be connected to the pressure output 21 of the secondary output pressure space 22 of the brake unit 16 when in its basic "O" position or, as an alternative, can be shut off relative to the latter in its excited "I" position. The basic "O" position of this brake pressure control valve 24 is its through-flow position in which the wheel brake cylinders of the wheel brakes 13 and 14 are in communicating connection with the secondary output pressure space 22 of the brake unit 16 and the excited "I" position of this brake pressure control valve 24 is its shut-off position in which the wheel brake cylinders of the rear wheel brakes 13 and 14 are shut off from the secondary output pressure space 22 of the brake unit 16, so that the brake pressure in the wheel brakes 13 and 14 remains at a previously selected value.

A hydraulically driven piston pump 27, is provided as the return pump by means of which brake fluid, which is drained form the wheel brakes 13 and 14 of the rear axle brake circuit II in the course of a brake pressure reduction phase of the antilocking control, is pumped back into the output pressure space 22, associated with the rear axle brake circuit II, of the tandem main brake cylinder 16. The piston pump is designed as a stepped cylinder whose housing 28 has two bore steps 32 and 33 which are coaxial relative to the central longitudinal axis 31 of the pump housing 28 and offset relative to one another by a radial step 29 which connects them. A correspondingly stepped pump piston is sealed by means of respective sealing rings 36 and 37, fixed relative to the piston, against the bore steps 32 and 33.

The pump chamber 41 has a movable axial boundary within the smaller bore step 32, formed by the smaller diameter piston step 38 of the pump piston 34 and by an axial boundary fixed relative to the housing, formed by an end wall 39 of the pump housing 28 which closes off this bore step 32 from the outside. Brake fluid is drawn from the connected wheel brakes 13 and 14 by the increase in volume of the pump chamber 41 and can be pumped back into the secondary output pressure space 22 of the tandem main cylinder 16 by a reduction in volume of the pump chamber 41.

The pump chamber 41 is connected, between the brake pressure control valve 24 and the rear wheel brakes 13 and 14, by means of an inlet non-return valve 42 to the main brake pipe 26 of the rear axle brake circuit II.

This inlet non-return valve 42 is subjected, in the opening direction, to the higher pressure in the wheel brake cylinders of the rear wheel brakes 13 and 14 relative to the pump chamber 41. The force which is necessary to drive the inlet non-return valve 42 into its open position is equivalent to a pressure difference of about 1 to 2 bar.

In addition, the pump chamber 41 is connected, between the brake pressure control valve 24 and the pressure output 21 of the secondary output pressure space 22 of the brake unit 16, to the pressure output 21 by means of an output non-return valve 43. This output non-return valve 43 is subject, in the opening direction, to the higher pressure in the pump chamber 41 relative to that in the secondary output pressure space 22 of the brake unit 16. Its "opening pressure" again having a typical value of between 1 and 2 bar.

A driving pressure space 47 of the return pump 27 has an axially movable boundary formed by the annular flange-shaped larger diameter piston step 44 of the pump piston 34, which is sealed so as to be displaceable relative to the corresponding larger bore step 33 of the pump housing 28 and a boundary fixed relative to the housing formed by the second end wall 46 of the pump housing 28. The filling and pump-back strokes of the piston 34 of the return pump 27 can be controlled by alternative valve controlled connection to either a non-pressurized sump tank 48 of a hydraulic auxiliary pressure source 49, or its pressure outlet 51 which is kept at high pressure level.

This auxiliary pressure source 49 includes, in an arrangement usual for this purpose, a reservoir 52, which is connected by means of an outlet non-return valve 53 to the pressure output line 51 and can be charged by means of a reservoir charging pump 54 via a reservoir charging valve 56. The charging operation is controlled by means of a pressure switch 57 which monitors the reservoir pressure. A pressure limiting valve 58 is also provided.

In the particular illustrative example shown, a solenoid valve, designed as a 3/2-way drive control valve 59 is provided for the return pump 27. In the basic "O" position of this solenoid control valve, the high pressure output 51 of the auxiliary pressure source 49 is connected to the drive pressure space 47 of the return pump 27 and the latter is shut off from the sump tank 48 of the auxiliary pressure source 49. In its excited "I" position, which it takes up when so directed by an output signal of an electronic control unit 61 provided to control the antilocking control operation, the drive pressure space 47 of the return pump 27 is connected to the sump tank 48 of the auxiliary pressure source 49 and is shut off from its high pressure output 51.

The pump piston 34 is provided with a central blind hole 62 which is open towards the valve chamber 41. This blind hole 62 accepts the major part of the length of a return spring 64 located coaxially with the central longitudinal axis 63 of the return pump 27. The return spring 64 is supported at one end on the bottom 66 of the blind hold 62 and at the other end on the end wall 39 of the pump housing 28 (which end wall forms a boundary of the valve chamber 41) and attempts to force the pump piston 34 into its end position associated with the maximum volume of the pump chamber 41. This end position is indicated by the pump piston 34 coming into contact with the other end wall 46 of the pump housing by means of a support protrusion 67, only slightly extended in the axial direction. In the end position of the pump piston 34, corresponding to the minimum volume shown of the pump chamber 41, the pump piston 34 is axially supported with its annular flange-shaped larger piston step 44 on the housing step 29. This end position, in which the pump piston 34 is held against the return force (maximum in this case) of the return spring 64 and the pressure present in the pump chamber 41 by the output pressure of the auxiliary pressure source 49 acting in the control pressure space 47, is used as the basic position for normal braking, i.e. braking not subject to the control system. 10 explained so far, a simple control cycle of an antilocking control achievable will now be explained.

As long as the antilocking control system has not responded, the brake pressure control valve 24 and the drive control valve 59 assume their basic "O" positions. The cross-sectional area $F_1$ of the larger piston step 44 of the piston 34 of the return pump 27 is subjected to the high output pressure $P_A$ of the auxiliary pressure source 49 and is held in its basic position associated with minimum volume of the pump chamber 41.

The area $F_2$ of the smaller piston step 38 of the pump piston 34 corresponds to the cross-sectional area of the smaller housing bore 32 and is subjected to the brake pressure connected to the wheel brakes 13 and 14. This pressure is connected to the pump chamber 41 via the inlet non-return valve 42.

The ratio $F_1/F_2$ of the effective piston areas of the pump piston 34 is chosen to be sufficiently large for the pump piston to be held in its end position (shown to the right in the drawing) even if the maximum brake pressure $P_B$ which can be generated by actuation of the main brake unit 16 is connected to the pump chamber 41 and it remains in this position as long as the drive pressure space 47 is connected to the high pressure output 41 of the auxiliary pressure source 49.

If a locking tendency appears on one of the rear wheel brakes, for example the left-hand rear wheel brake 13, the introductory pressure reduction phase of the antilocking control system necessary in this case is achieved by the brake pressure control valve 24 being switched into its shut-off "I" position and, similarly, the drive control valve 59 switched into its excited "I" position in which the drive pressure space 47 now has its pressure relieved into the sump tank 48 of the auxiliary pressure source 49. The consequence of this is that the pump piston 34 is now displaced by the return spring 64 and the pressure present in the pump chamber 41 is reduced so as to increase the volume of the pump chamber 41. Brake fluid therefore flows from both rear wheel brakes 13 and 14, as required for control on the select-low principle, via the inlet non-return valve 42 into the pump chamber 41, giving a corresponding pressure reduction on both rear wheel brakes 13 and 14. If, after such a pressure reduction phase, the brake pressure at the wheel brakes 13 and 14 subject to the control system are held at this reduced value, the return pump 27 is switched over to pump-back operation by the drive control valve 59 being switched back into its basic "O" position in which it connects the drive pressure space 47 to the pressure outlet 51 of the auxiliary pressure source 49, with the brake pressure control valve 24 being kept in its shut-off "I" position. Due to the renewed action of the pressure in the drive pressure space 47, the pump piston 34 now experiences a displacement such as to reduce the volume of the pump chamber 41 so that brake fluid from this chamber is pumped back via the now opening output non-return valve 43 into the output pressure space 22 of the brake unit 16 associated with the rear axle brake circuit 11. If required, further antilocking control system pressure reduction and pressure retention phases, which become necessary, can be controlled in an analogous manner. Because of the reaction of the brake pedal 17, in the sense of a deflection back towards its basic position which is caused by brake fluid being pumped back into the secondary output pressure space 22 of the brake unit 16, the driver is provided with an obvious feedback on the activation of the antilocking system 10.

If the locking tendency in the rear axle brake circuit II has been ended by the antilocking control system so that brake pressure can be built up again in this brake circuit, the brake pressure control valve 24 is switched back into its basic "O" through-flow position. Because a brake pressure retention phase or a pump-back phase generally precedes a brake pressure build-up phase of the antilocking control system, the drive control valve 59 is already in its basic "O" position in this situation. In the case where a brake pressure restoration phase should become necessary immediately after a brake pressure reduction phase of the antilocking control system, it is, of course, necessary that the drive control valve 59 should be switched back to its basic "O" position in addition to the brake pressure control valve 24 being switched back into its basic "O" position. If, corresponding to a particular design of the return pump 27, the increase in volume of the pump chamber 41, which can be used for a reduction of brake pressure in the rear wheel brakes 13 and 14, is markedly smaller than the volume of that quantity of brake circuit II when the maximum brake pressure possible from the design of the brake installation is built up in this brake circuit, e.g. corresponding to only ¼ of the volume of this brake fluid quantity, it is then possible that a single pressure reduction stroke of the pump piston 34 will not suffice for a brake pressure reduction appropriate to the situation. It is then necessary to control the return pump 27 so that it repeatedly carries out pressure reduction strokes followed by pump-back strokes, which can, for example, take place by means of a control pulse series with a specified fixed periodicity, the duration of the periods of such pulses being selected to be as small as possible in order to achieve a pressure reduction which is as rapid as possible overall, but sufficiently long to permit full utilization of the strokes possible.

The control signals necessary for correct control of the brake pressure control valve 24 and the drive control valve 59 are generated by the electronic antilocking control system control unit 61 according to known criteria, essentially by a process of comparing and differentiating—with respect to time—the output signals from wheel rotational speed sensors 68, 69 and 71, 72 which, in the particular illustrative example shown, are respectively allocated individually to the front wheels and the rear wheels of the vehicle and generate electrical output signals characteristic of their peripheral speeds in terms of level and/or frequency. In the case of an antilocking system operating on the rear axle according to the select-low principle, it is sufficient if (as shown in dotted lines) only one rotational speed sensor 73 is provided for the rear axle, the output signal of this sensor being a measure of the average value of the wheel peripheral speeds of the rear wheels of the vehicle.

In the particular design of the antilocking system 10 shown, the return pump 27 is equipped with a position indicator 74 which generates an electrical output signal continuously varying with deflections of the pump piston 34 and characteristic of the current piston position. This pump position signal is fed as an additional information input to the electronic control unit 61 of the antilocking system 10. This position indicator 74, which can be designed in an intrinsically known manner, as a resistance signal generator or an inductive signal generator, records the position (which varies in a radial direction with piston position) of an actuation pin 76 whose free end is supported on a conical outside surface 77 of the pump piston 34. This conical outside surface extends between the flange regions 38 and 44 of the smaller and larger piston steps of the pump piston respectively, is sealed against the smaller bore step 32 and the larger bore step 33, and becomes narrower towards the larger piston step 44, as may be seen from the drawing. The axial extent and shape of this conical outside surface 77 is selected in such a way that the output signal of the position indicator 74 is correlated in an unambiguous manner with the piston position in each of the possible intermediate positions between the two end positions of the pump piston 34. The output signal of the position indicator 74 can be used in an obvious manner for controlling, to suit the requirements, the reversal of motion of the pump piston 34 from pressure reduction operation to pumping operation. Because of this output signal, it is, for example, possible to recognize directly when the pump piston has arrived in the immediate vicinity of its particular end position and that therefore, switch-over of the pump drive should be initiated, if necessary.

The position indicator output signal can also be used in many ways for functional and leak checking of the brake pressure control valve 24 and the drive control valve 59.

A safety non-return valve 78 is connected in parallel with the brake pressure control valve 24, i.e. between the pressure output 21 of the brake unit 16 associated with the rear axle brake circuit II and the branch position 83 of the main brake pipe 26 of the rear axle brake circuit II from which the brake pipe branches 26', 26" leading to the wheel brakes 13 and 14 emerge. This safety non-return valve 78, which is subjected in the direction of the opening to the higher pressure in the wheel brakes 13 and 14 relative to that in the output pressure space 22 of the brake unit 16 associated with them, permits—if the driver withdraws the Pedal actuation force—a desired rapid equalization of the brake pressure present in the wheel brakes 13 and 14 to the lowered expected value selected by the driver.

In a special design, the return pump 27 of the antilocking system 10 can also be dimensioned in such a way that a single pressure reduction stroke of the pump piston 34 is enough to achieve complete pressure reduction at the wheel brakes 13 and 14 of the rear axle brake circuit II even in the case of full braking and, in consequence, a single pump-back stroke of the pump piston 34 is also sufficient to pump back the brake fluid drained from the wheel brakes 13 and 14 into the output pressure space 22 of the brake unit 16. In the case of such dimensioning of the return pump 27, the latter should be equipped with a position indicator 74, as explained above, so that small deflections of the pump piston 34 to meet the requirements can be controlled.

Figure 2:
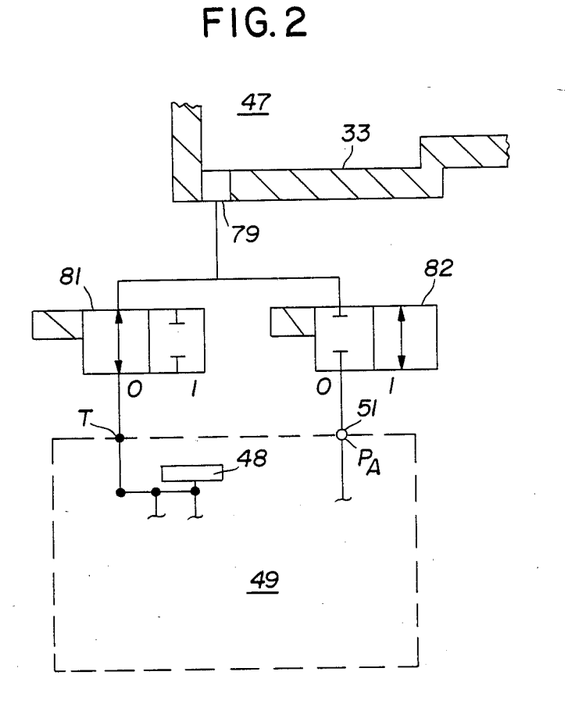
FIG. 2 shows a modified valve system for the above block circuit diagram.

In addition, an advantageous feature provided in a particular though the FIG. 2 design is to provide two 2/2-way solenoid valves 81, 82 instead of a single 3/2-way solenoid valve 59, one of these two solenoid valves 81 being connected between the control connection 79 of the drive pressure space 47 of the return pump 27 and the high pressure output 51 of the auxiliary pressure source 49 as an inlet control valve and the other 2/2-way solenoid valve being connected as an outlet control valve 81, between the control connection 79 of the drive pressure space 47 and the sump tank 48 of the auxiliary pressure source 49. The basic position of the inlet control valve is its through-flow position and the basic position of the outlet control valve is its shut-off position.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Antilocking system for a road vehicle with a hydraulic two-circuit brake installation in which rear wheel brakes are combined in a static brake circuit, which is connected to an output pressure space of a main brake unit means which can be actuated by means of a brake pedal;
    wherein said main brake unit means is capable of generating an output pressure proportional to the actuating force of the pedal;
    wherein said output pressure is connected to the wheel brakes of said static brake circuit by means of brake pressure control valve means provided for controlling brake pressure reduction, brake pressure retention and brake pressure restoration phases;
    wherein the antilocking system operates on the pump-back principle according to which, in a brake pressure reduction phase, brake fluid is drained from wheel brakes subject to the control system and is pumped back by a return pump means into the output pressure space of the main brake unit means associated with the static brake circuit;
    wherein said return pump means is a piston pump which is driven hydraulically by a drive pressure space being subjected to and relieved from pressure by control of solenoid valve means;
    wherein an output pump chamber of the piston pump is connected to wheel brakes currently subjected to the control system via an inlet non-return valve and via an outlet non-return valve to the output pressure space of the main brake unit associated with the static brake circuit;

wherein an antilocking control takes place on the select-low principle according to which, independent of whether a locking tendency occurs on one or both rear wheels of the vehicle, brake pressure applied to both rear wheel brakes by the main brake unit means is always kept at the same value;

wherein control signals generating means for switching of the brake pressure control valve means and the solenoid valve means controlling the pump operation are provided by an electronic control unit means, which generates these signals by a process of comparing and differentiating—with respect to time—electrical output signals from wheel rotational speed sensors whose output signals, in level and/or frequency, are a measure of the wheel peripheral speeds of the vehicle wheels;

wherein the brake pressure control valve means is a 2/2-way solenoid valve which is located hydraulically in parallel with the output pump chamber and the inlet and outlet non-return valves connected to it, between an output of the main brake unit means associated with the static brake circuit and a section of a main brake pipe of the rear axle brake circuit branching to the wheel brakes of the static brake circuit;

said 2/2-way solenoid valve associated with normal braking operation not subject to control, is in a through-flow position wherein it connects the pressure space of the main brake unit means to the rear wheel brakes;

wherein a change of volume of the outpump chamber between a minimum and maximum value is at least ¼ of a volume of that quantity of brake fluid which must be forced into the rear axle brake circuit in order to generate a maximum possible brake installation design pressure in the wheel brakes of said brake circuit;

wherein the electronic control unit means for controlling brake pressure reduction phases of the antilocking control generates a combination of output signals by means of which the brake pressure control valve means is switched into its shut-off position and the drive pressure space of the return pump means is initially connected to a sump tank of an auxiliary pressure source and is subsequently reconnected to a pressure output, of the auxiliary pressure space for controlling the brake pressure retention phases by connecting the drive pressure space of the return pump means to the pressure output of the auxiliary pressure source while the brake pressure control valve means is held in its shut-off position; and wherein for controlling brake pressure restoration phases, the electronic control means generates signal combination by means of which the drive pressure space of the return pump is connected to the high pressure output of the auxiliary pressure source and the brake pressure control valve is switched back into its through-flow position.

2. Antilocking system according to claim 1, wherein a maximum volume change of the pump chamber is between 50% and 100% of the volume of that quantity of brake fluid which must be forced into the static brake circuit in order to generate the maximum possible brake installation design pressure in both wheel brakes.

3. Antilocking system according to claim 1 wherein an electrical position indicator is provided which generates characteristic electrical output signals indicative of the position of the pump piston and that these position indicator output signals are fed to the electronic control unit means as information inputs.

4. Antilocking system according to claim 2 wherein an electrical position indicator is provided which generates characteristic electrical output signals indicative of the position of the pump piston and that these position indicator output signals are fed to the electronic control unit means as information inputs.

5. Antilocking system according to claim 1, wherein the solenoid control valve means, provided for connecting the drive pressure space of the return pump to the auxiliary pressure source and for shutting off the latter from the drive pressure space, includes two 2/2-way solenoid valves of which one is connected between the high pressure output of the auxiliary pressure source and a control connection leading to the drive pressure space of the return pump and wherein the second is connected between the sump tank of the auxiliary pressure source and this control connection;

the basic position of the first 2/2-way solenoid valve being its open position and the basic position of the second 2/2-way solenoid valve being its shut-off position.

6. Antilocking system according to claim 2, wherein the solenoid control valve means provided for connecting the drive pressure space of the return pump to the auxiliary pressure source and for shutting off the latter from the drive pressure space includes two 2/2-way solenoid valves of which one is connected between the high pressure output of the auxiliary pressure source and a control connection leading to the drive pressure space of the return pump and wherein the second is connected between the sump tank of the auxiliary pressure source and this control connection;

the basic position of the first 2/2-way solenoid valve being its open position and the basic position of the second 2/2-way solenoid valve being its shut-off position.

7. Antilocking system according to claim 3, wherein the solenoid control valve means provided for connecting the drive pressure space of the return pump to the auxiliary pressure source and for shutting off the latter from the drive pressure space includes two 2/2-way solenoid valves of which one is connected between the high pressure output of the auxiliary pressure source and a control connection leading to the drive pressure space of the return pump and wherein the second is connected between the sump tank of the auxiliary pressure source and this control connection;

the basic position of the first 2/2-way solenoid valve being its open position and the basic position of the second 2/2-way solenoid valve being its shut-off position.

8. Antilocking system according to claim 4, wherein the solenoid control valve means provided for connecting the drive pressure space of the return pump to the auxiliary pressure source and for shutting off the latter from the drive pressure space includes two 2/2-way solenoid valves of which one is connected between the high pressure output of the auxiliary pressure source and a control connection leading to the drive pressure space of the return pump and wherein the second is connected between the sump tank of the auxiliary pressure source and this control connection;

the basic position of the first 2/2-way solenoid valve being its open position and the basic position of the second 2/2-way solenoid valve being its shut-off position.

9. Antilocking system according to claim 1 wherein a non-return valve is provided hydraulically in parallel with the brake pressure control valve means and is acted upon in the opening direction by a pressure in the main brake pipe of the static brake circuit which is higher than a pressure in the associated output pressure space in the brake unit, and is otherwise shut off.

10. Antilocking system according to claim 2 wherein a non-return valve is provided hydraulically in parallel with the brake pressure control valve means and is acted upon in the opening direction by a pressure in the main brake pipe of the static brake circuit which is higher than a pressure in the associated output pressure space in the brake unit, and is otherwise shut off.

11. Antilocking system according to claim 3 wherein a non-return valve is provided hydraulically in parallel with the brake pressure control valve means and is acted upon in the opening direction by a pressure in the main brake pipe of the static brake circuit which is higher than a pressure in the associated output pressure space in the brake unit, and is otherwise shut off.

12. Antilocking system according to claim 4 wherein a non-return valve is provided hydraulically in parallel with the brake pressure control valve means and is acted upon in the opening direction by a pressure in the main brake pipe of the static brake circuit which is higher than a pressure in the associated output pressure space in the brake unit, and is otherwise shut off.

13. Antilocking system according to claim 5 wherein a non-return valve is provided hydraulically in parallel with the brake pressure control valve means and is acted upon in the opening direction by a pressure in the main brake pipe of the static brake circuit which is higher than a pressure in the associated output pressure space in the brake unit, and is otherwise shut off.

14. Antilocking system according to claim 6 wherein a non-return valve is provided hydraulically in parallel with the brake pressure control valve means and is acted upon in the opening direction by a pressure in the main brake pipe of the static brake circuit which is higher than a pressure in the associated output pressure space in the brake unit, and is otherwise shut off.

15. Antilocking system according to claim 7 wherein a non-return valve is provided hydraulically in parallel with the brake pressure control valve means and is acted upon in the opening direction by a pressure in the main brake pipe of the static brake circuit which is higher than a pressure in the associated output pressure space in the brake unit, and is otherwise shut off.

16. Antilocking system according to claim 8 wherein a non-return valve is provided hydraulically in parallel with the brake pressure control valve means and is acted upon in the opening direction by a pressure in the main brake pipe of the static brake circuit which is higher than a pressure in the associated output pressure space in the brake unit, and is otherwise shut off.

* * * * *